Feb. 14, 1961          R. N. GHOSE          2,972,105
MAGNETIC FIELD RESPONSIVE APPARATUS
Filed May 11, 1959                              2 Sheets-Sheet 1
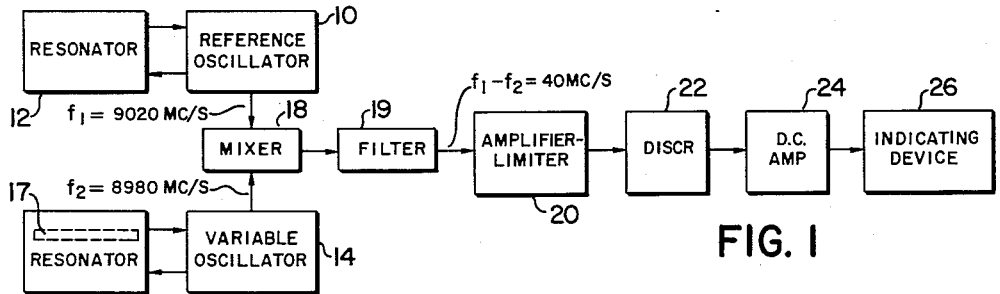
FIG. 1
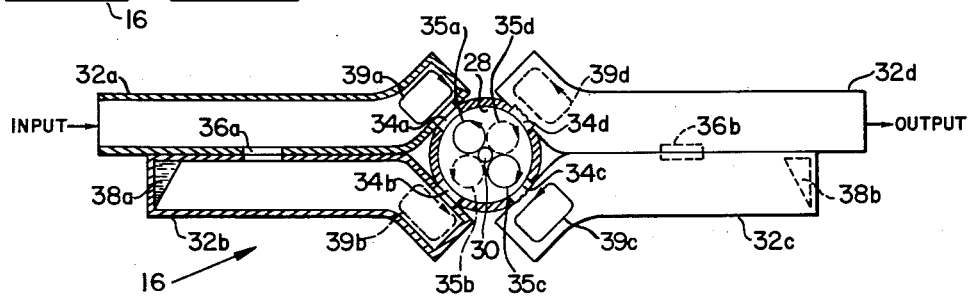
FIG. 4
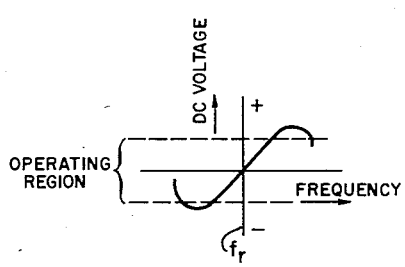
FIG. 2
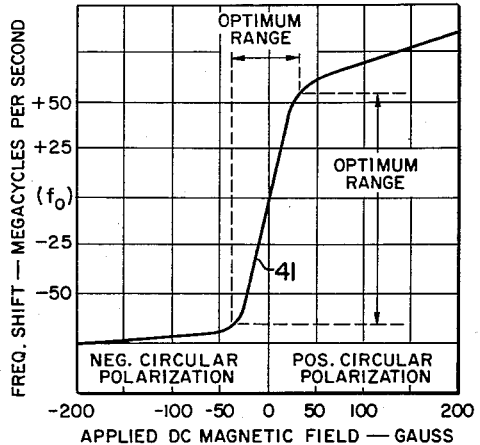
FIG. 5
FIG. 3
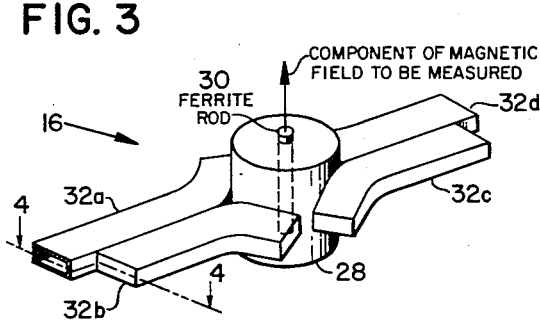
RABINDRA N. GHOSE
BY Jerry A. Dinardo
AGENT
Albert Rosen
ATTORNEY Feb. 14, 1961 R. N. GHOSE 2,972,105
MAGNETIC FIELD RESPONSIVE APPARATUS
Filed May 11, 1959 2 Sheets-Sheet 2

RABINDRA N. GHOSE
BY *Jerry A. Dinardo*
AGENT
*Albert Rosen*
ATTORNEY

United States Patent Office 2,972,105
Patented Feb. 14, 1961

2,972,105

MAGNETIC FIELD RESPONSIVE APPARATUS

Rabindra N. Ghose, Los Angeles, Calif., assignor to Space Technology Laboratories, Inc., Los Angeles, Calif., a corporation of Delaware Filed May 11, 1959, Ser. No. 812,507

15 Claims. (Cl. 324—43)

This invention relates to the art of detecting and measuring magnetic fields, and proves especially advantageous in the measurement of relatively weak magnetic fields. While not limited thereto, the invention is herein described with reference to a magnetic field measuring apparatus. Thus, it is realized that the principles of the invention may be applied to methods and apparatus designed for other than measuring purposes but which are nevertheless predicated upon response to magnetic field variations; for example, the invention may be used in connection with magnetic compasses or navigation apparatus.

While magnetic field detecting and measuring devices are known, they have not proven entirely satisfactory. For example, certain types of magnetometers, or magnetic field measuring instruments, are known which contain delicate parts, thereby rendering them unsuitable for applications where extreme conditions of shock and vibration would substantially affect the reliability of the measurements. Furthermore, other types of magnetometers now in use consume substantial amounts of power or are insensitive to relatively weak magnetic fields.

It is therefore an object of this invention to provide an improved magnetic field sensing and measuring means characterized by simplicity and ruggedness of construction, and low bulk, weight, and power requirements.

A further object of this invention is to provide an improved means for accurately measuring relatively weak magnetic fields.

The foregoing and related objects are realized in accordance with the invention by making use of a certain ferromagnetic resonance phenomenon. According to this phenomenon the resonant frequency of a cavity containing a ferromagnetic material of the kind that exhibits ferromagnetic resonance phenomena (say, for example, a ferrite element), changes in response to changes in magnetic field applied to the ferrite element. By exciting the cavity with electromagnetic radiation at a frequency at or near the region of ferromagnetic resonance of the ferrite element, wide variations in the resonant frequency of the cavity are realized with relatively small variations in magnetic field strength. Since the change in resonant frequency of the cavity is a function of the magnetic field strength, relatively high sensitivity is realized.

In accordance with one embodiment of the invention two microwave signals of slightly different frequency are generated by the use of apparatus including two separate microwave signal generators, each generator being associated with a resonant cavity. The frequency of one of the signals is variable, while that of the other signal is maintained constant. The resonant cavity associated with the variable frequency signal contains, or is loaded with, a ferrite element having a predetermined axis of orientation. When this cavity is subjected to an external or environmental magnetic field along the axis of the ferrite element, a change is realized in the resonant frequency of that cavity, and thus also in the frequency of the signal associated with it. The other cavity is free of such ferrite elements, and the resonant frequency of this cavity is relatively insensitive to external magnetic fields. The two signals are compared or mixed together to produce a difference or heterodyne signal; the frequency of this heterodyne signal varies as the external magnetic field variations cause the resonant frequency of the ferrite loaded cavity to change. The heterodyne signal is amplified and the frequency variation is detected, as for example by means of a discriminator circuit, so as to produce a direct current output signal representative of the frequency of the heterodyne signal and hence of the magnitude of the environmental magnetic field to be measured. The direct current output signal may then be applied to a meter or similar indicating device to obtain a direct measure of the environmental magnetic field, or the signal may be fed to some other utilization device where advantageous use can be made of the signal information representative of the environmental magnetic field.

In the drawings:

Fig. 1 is a block diagram of magnetometer apparatus embodying the invention, and useful in measuring a single component of an environmental magnetic field;

Fig. 2 is a graph depicting the characteristics of a discriminator circuit used in the apparatus of Fig. 1;

Fig. 3 is a partially schematic, perspective view of a portion of a ferrite mounted cavity resonator used in the apparatus of Fig. 1;

Fig. 4 is an enlarged sectional view taken along line 4—4 of Fig. 3;

Fig. 5 is a graph showing the frequency characteristics of the ferrite mounted cavity resonator of Figs. 3 and 4 as a function of magnetic field strength;

Figure 9:
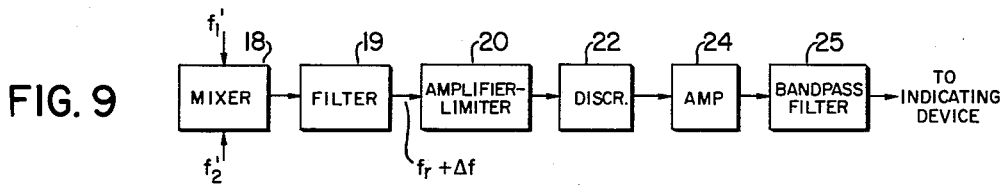
Fig. 9 is a block diagram of a circuit useful in connection with the magnetometer apparatus of Fig. 7.

There is illustrated in Fig. 1 a block diagram of the novel magnetometer apparatus of the invention useful in the measurement of the magnetic field strength of one component of an environmental magnetic field. The magnetic field strength to be measured may be of the order of a very small fraction of one gauss in magnitude. In this embodiment of the invention a first stable microwave oscillator 10, hereinafter called the first or reference oscillator, is arranged to generate a first microwave signal of constant frequency $f_1$, which by way of example can be a frequency of 9020 megacycles per second. The reference oscillator 10 may include in its tuning circuit a cavity resonator 12 of conventional design. The resonant frequency of the cavity resonator 12 is not substantially affected by external magnetic fields.

A second or variable microwave oscillator 14 is provided that is similar to the reference oscillator 10 except that this second oscillator includes, in its tuning circuit, a second cavity resonator 16 which contains an element or body 17 made of a ferromagnetic material of any of the known types (such as ferrites) that are capable of exhibiting ferromagnetic resonance phenomena. In such a material the apparent permeability of the material at microwave frequencies is affected, in the presence of a static magnetic field, in a manner such that the electron orbits of the atoms making up the material appear to precess in the presence of the magnetic field. If the microwave signal frequency to which the material is subjected substantially equals the precession frequency, resonance occurs. If such a ferromagnetic material is positioned within the influence of a resonant cavity, and the resonant frequency of the cavity is in the effective neighborhood of the ferromagnetic resonance frequency of the material, the material will act to change the effective resonant frequency of the cavity as a function of the strength of the magnetic field applied to the material. While different types of ferromagnetic materials may be used, for example both solids and plasmas prove useful, in practicing the invention ferromagnetic materials of the type known as ferrites may be advantageously used in view of their present easy availability. By ferrites there is meant materials that belong to the group of compounds of composition represented by the general chemical formula $MOFe_2O_3$, where M is a divalent metal ion such as Mn, Co, Ni, Cu, Mg, Zn, Cd, $Fe^{2+}$, or a mixture of these ions. These ferrites are cubical in crystal structure, and have a spinel structure similar to that exhibited by the mineral spinel ($MgAlO_4$). Ferrites may be imagined as derived from magnetite, $Fe_3O_4$, by replacing the ferrous ions of the magnetite by the divalent ions listed above. Among the ferrites that may be used are those described, for example, in "Ferromagnetism" by Richard M. Bozorth, published in 1956 by the D. Van Nostrand Company of Princeton, New Jersey, on pages 244 to 249.

As is known, a body 17 of such a material, say a ferrite body, acts to change the resonant frequency of the resonator 16 associated with it when the body is acted upon by an external magnetic field having a magnetic field component in a direction along the axis of the body. Hence, the frequency $f_2$ of the output signal of the second oscillator 14, unlike that of the reference oscillator 10, is not constant in frequency but is variable as a function of the strength of the magnetic field applied to the ferrite body. The second or variable frequency oscillator 14 is designed to produce an output signal that is normally (in the absence of any appreciable environmental magnetic field) slightly different in frequency from that of the first or reference oscillator 10. The frequency $f_2$ of this second signal may be of the order of 8980 megacycles per second, for example. The two signals $f_1$ and $f_2$ generated by the two oscillators 10 and 14, thus may normally differ by a frequency of approximately 40 megacycles per second.

The two signals from the oscillators 10 and 14 are heterodyned in a mixer circuit 18, which may be any one of the well-known microwave crystal mixer circuits, to produce a beat or difference frequency signal of frequency $f_1-f_2$. This difference frequency ($f_1-f_2$) is varied in accordance with the frequency variations produced in the output signal of the variable oscillator 14 by variations in magnitude of the magnetic field being measured. The output of the mixer circuit 18 is fed through a band-pass filter 19 to select this difference frequency. In this case the filter 19 is tuned to a band of frequencies centered at 40 megacycles per second, this band encompassing the range of expected variations in difference frequency between the signals from the two oscillators 10 and 14. If the range of magnetic field strengths to be measured is of the order of 1 or 2 gauss in extent, a band width of about 4 megacycles per second is adequate for the filter 19. The filter 19 may, for example, be any conventional lumped-element band-pass filter of the kind used in intermediate frequency amplifiers. Suitable filters are described in Radio Engineers Handbook by Fredrick E. Terman, first edition, published in 1943 by the McGraw-Hill Book Co., New York city, New York, on pages 170 to 172. The difference frequency signal appearing at the output of the filter 19 is fed to an amplifier-limiter 20 where it is amplified and amplitude limited to some predetermined value. Suitable amplifiers which may be used in the amplifier-limiter 20 are described in the aforementioned Terman Handbook on pages 434 to 441. Suitable limiter circuits are described in the same handbook on pages 668 to 670.

As indicated previously, the output frequency of the variable oscillator 14 is a function of the applied magnetic field to be measured, this magnetic field exerting its influence upon the ferrite body 17 contained in the second cavity resonator 16. Thus, any variations occurring in this magnetic field will correspondingly alter the frequency of the output signal from the variable oscillator 14. In order to detect these frequency variations, and thus develop a magnetic-field-representing output signal which varies in amplitude solely as a function of the frequency of the signal from the variable oscillator 14, the output from the amplifier-limiter 20 is fed to a discriminator circuit 22. This discriminator circuit 22 may be any of the conventional discriminator circuits suitable for the reception of frequency modulated signals. Various types of discriminator circuits which may be used are described in the Terman Handbook referred to, on pages 585 to 588. The characteristics of the discriminator circuit 22 are illustrated in Fig. 2. As shown in this figure, the output of the discriminator circuit 22 is a direct current voltage which varies linearly (over a predetermined range) with the variation of the difference frequency signal ($f_1-f_2$) from its resonance frequency $f_r$, the resonance frequency $f_r$ of the difference frequency signal being defined as the difference frequency signal representative of a zero environmental magnetic field.

The direct current output signal from the discriminator circuit 22 is fed to a direct current amplifier 24 to raise the signal to a suitable level for actuating an indicating or other utilization device 26. For example, where the magnetometer is used in a remote controlled vehicle the utilization device may be a telemetering transmitter.

Thus it is seen that, since the output from the discriminator circuit 22 is a signal which is a function of the difference between the frequency of the variable oscillator 14 and the frequency of the reference oscillator 10, with this difference frequency being a function of the applied magnetic field, the signal output from the discriminator circuit is a measure of the applied magnetic field.

Some of the circuits and components illustrated in Fig. 1 will now be discussed in greater detail. The oscillators 10 and 14 may comprise conventional microwave signal generators which, together with the resonant cavities or resonators 12 and 16, are suitably stabilized. For example reflex klystrons, such as those commonly referred to as the model X-13 klystron, made by Varian Associates of California, may be used.

An example of a ferrite loaded cavity resonator 16 which can be used in conjunction with the variable oscillator 14, to produce an output signal which varies as a function of the applied magnetic field, is illustrated in Figs. 3 and 4. The resonator 16 comprises a cylindrical cavity 28 defined by walls made of magnetically permeable material, such as fused quartz plated with platinum, and containing a cylindrical ferrite rod 30 mounted coaxially within the cavity. For convenience of explanation the ferrite rod 30 is illustrated as being unmagnetized (that is, having only a small residual permanent magnetization) and having a ferromagnetic resonance frequency in the neighborhood of the normal resonant frequency of its associated cavity. However, it is realized that if the ferrite rod exhibits its ferromagnetic resonance response in a frequency neighborhood different from that of the resonant frequency of its associated resonant cavity, the ferrite rod may be premagnetized. In such a case the premagnetization may be effected by having the ferrite rod permanently magnetized, or by subjecting the rod to a biasing magnetization, as by means of a suitable bias current, not shown. This premagnetization sets up a polarizing field in the ferrite rod so as to shift the frequency neighborhood of ferromagnetic resonance to that of the cavity.

Referring again to Figs. 3 and 4, the cavity 28 is coupled to four rectangular wave guides 32a, 32b, 32c, and 32d through respective wave guide apertures 34a, 34b, 34c, 34d, oriented 90 degrees apart so as to cause two orthogonal $TM_{110}$ modes to be excited within the cavity 28. One mode is excited by a first pair of oppositely oriented apertures 34a and 34c. The magnetic fields associated with this first mode are depicted by circular arrows 35a and 35c. The other mode, which is orthogonal to the first mode, is excited by the other pair of oppositely oriented apertures 34b and 34d. The magnetic fields associated with this other mode are indicated by circular arrows 35c and 35d. Two side wall couplers 36a and 36b divide the signal energy equally between, respectively, the wave guides 32a and 32b and wave guides 32c and 32d. Such couplers 36a and 36b are usually referred to as 3 decibel couplers. Matched loads 38a and 38b are positioned at the end portions of wave guides 32b and 32c. A similar construction can be used for the constant frequency reference resonator 12 (Fig. 1), except that the reference resonator would not contain a ferrite element.

In the operation of the resonator 16 (Fig. 3), microwave energy entering into the cavity 28 from the input end thereof (through the input wave guide 32a) is divided by the side wall coupler 36a associated with it so that one-half of the energy reaches the first cavity aperture 34a and the other half reaches the second cavity aperture 34b, with the signal arriving at the second aperture lagging that at the first aperture 34a by 90 electrical degrees in time. The magnetic fields within the four wave guides 32a to 32d and adjacent to the apertures are indicated by dashed line arrows 39a, 39b, 39c, and 39d. The magnetic fields of the signals adjacent to the apertures 34a and 34b are thus 90 degrees out of phase with each other, with the result that there is generated within the cavity 38 a rotating cavity mode in a counterclockwise direction (that is, counterclockwise with respect to the view of Fig. 4). At or near resonance, the energy in the cavity is coupled to the output wave guides 32c and 32d through apertures 34c and 34d, respectively. The signals appearing at the output apertures 34c and 34d are likewise 90 degrees out of time phase with each other. Thus, an addition of the signal energies occurs at the output end of the open ended output wave guide 32d, whereas a signal cancellation takes place at closed end of the other output wave guide 32c, that is, at the wave guide end terminated by the matched load 38b.

The presence of a component of magnetic field (such as an environmental field to be measured) in a direction along the longitudinal axis of the elongated ferrite rod 30 mounted in the center of the cavity 28 causes the signal energy in the cavity 28 to take the form of rotating field patterns, with different resonant frequencies for positive and negative senses of rotation and for different strengths of magnetizing field applied to the ferrite rod 30. Input signal energy, entering the cavity 28 by way of the open-ended input wave guide 32a, will tend to couple into a clockwise rotating mode within the cavity, corresponding to positive circular polarization. With the magnetic field applied in the direction shown in Fig. 3 (in a direction up and out of the plane of the drawing of Fig. 4) the non-reciprocal character of the ferrite rod 30 makes any increase in the magnitude of the applied magnetic field tend to increase the resonant frequency of the cavity 28.

Fig. 5 illustrates a typical curve 41 of resonant cavity frequency shift, due to the ferrite rod 30 in the example of Figs. 3 and 4, in the presence of different values of applied D.C. magnetic field. The ferrite rod 30 in the example is ⅛ inch in diameter, 1.6 inches in length, and extends beyond each of the end walls defining the cavity 28. The cavity 28 is 1.59 inches in diameter by 0.69 inch in length and the apertures (34a to 34d) are .30 inch in diameter. A central resonant frequency $f_0$ of 8980 megacyles per second, of the variable frequency cavity 28, corresponds to that frequency at which there is zero applied magnetic field. The curve 41 shows the resonant frequency shift from $f_0$ for various values of applied D.C. magnetic field, both for the case of positive circular polarization and of negative circular polarization. Since (as shown in Fig. 5) the change in frequency with change in magnetic field strength changes from an essentially linear to a nonlinear relationship with magnetic field strength of relatively large magnitudes, the optimum operating region is preferably within the linear change region, else the nonlinear response must be compensated for. Since the greatest linearity, as well as greatest frequency change per unit magnetic field strength change, lies in the region of relatively low magnetic field strengths, the arrangement of the invention proves especially advantageous in the measurement of such low field strengths.

Referring again to Fig. 5, it can be seen that for both negative and positive circular polarization, a change in applied magnetic field in the neighborhood of about 50 gauss will produce a change in resonant frequency of about 70 megacycles from a zero magnetic field frequency of 8980 megacycles per second. In other words, for the apparatus used in providing the example depicted in Fig. 5, there is a frequency change of about 1.4 cycles per second per microgauss. Since changes in frequency of appreciably less than 100 cycles in 40 megacycles can be readily detected by available discriminator circuits, a sensitivity of the order of 100 microgauss or better can be easily realized. In order to exceed this sensitivity, it may be desirable to provide some means for stabilizing the temperatures of the two cavities, so as to avoid frequency drift of the cavities. One means of realizing temperature stabilization, for example, may include a container within which the two cavities are maintained in mutual thermal contact so that any variation in ambient temperature will cause both cavities to change temperature by equal amounts. Since the output frequencies of both oscillators 10 and 14 will change equally in the same direction, the frequency difference between the two oscillators will remain substantially constant. While the reference oscillator 10 has been described as being of the same general type as that of the variable oscillator 12, in order that the two oscillators exhibit similar inherent frequency drift tendencies so that the drift of one will tend to cancel that of the other, it is realized that the oscillators may be of different types. For example, the reference oscillator 10 may take the form of a very stable oscillator of the atomic clock variety. This type of oscillator may be of the kind that makes use of the atomic resonance of an alkaline metal, such as rubidium, as a frequency standard. Atomic clocks are discussed, for example, in three articles by M. Arditi and T. R. Carver, A. O. McCoubrey, and W. Mainburger and A. Orenberg, respectively, in the 1958 IRE National Convention Record, part I, pages 3 to 18. Such atomic clock oscillators are capable of stabilities of the order of 5 parts in $10^{10}$.

While one form of ferrite loaded cavity resonator has been described, it will be understood that other types of ferrite loaded resonators can be used in place of the one depicted. For example, other suitable resonators are disclosed in an article entitled "Ferrite Tunable Microwave Cavities and the Introduction of a New Reflectionless, Tunable Microwave Filter," by Conrad E. Nelson in the Proceedings of the IRE, vol. 44, No. 10, October 1956, on pages 1449–1455.

Figure 6:
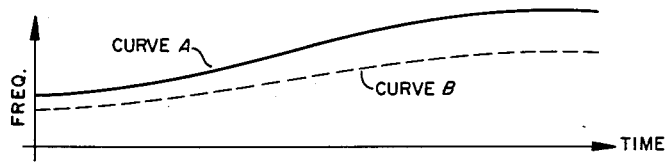
Fig. 6 is a graph depicting frequency drift of cavity resonators with time.

As has been described, the magnetic field measurement apparatus of the invention is predicated upon detecting a change in frequency in a ferrite element loaded cavity resonator brought about by the action of the magnetic field on the ferrite element. Consequently, it is important to assure that any changes in resonator frequency are brought about solely by changes in the magnetic field and not by frequency drift of the resonators. While temperature compensation may be effective to minimize frequency drift due to thermal effects, it will not eliminate other sources of drift, such as may be brought about by changes in size and shape of the resonator walls due to the subjection of the resonators to extreme variations in vibration or other mechanical shock. Furthermore, the two resonators 12 and 16 may not drift at the same rate over a long period of time. For example, referring to the graph of Fig. 6, the frequency drift of the first resonator 12, indicated by the solid line curve A, may be different from that of the ferrite loaded resonator 16, represented by the broken line curve B.

The undesirable effects of frequency drift in the resonators 12 and 16, from whatever source it originates, may be substantially entirely eliminated by the following arrangement. In this arrangement, illustrated schematically in Fig. 7, the ferrite loaded cavity resonator 16 is physically rotated at some convenient rate so as to change the orientation of the ferrite with respect to the component of the environmental magnetic field to be measured.

Figure 7:
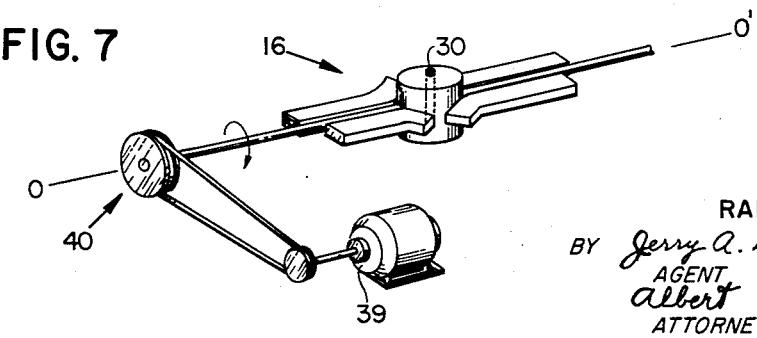
Fig. 7 is a diagrammatic view of a modification of a portion of the apparatus of Figs. 1 to 4.

As shown schematically in Fig. 7 the second resonator 16, containing the elongated ferrite body 30, is mounted for rotational movement about an axis O—O' which is perpendicular to the long axis of the ferrite body. In this example the component of the magnetic field to be measured is in a plane perpendicular to the axis of rotation. A motor 39 and pulley arrangement 40 may be used to effect rotation of the resonator 16 so that, at one instant of time the ferrite body is aligned in one sense with respect to the magnetic field to be measured, while at an instant of time one-half rotational cycle later the ferrite body is aligned in a sense opposite that of the first sense. The resonant frequency of the cavity follows the variation in orientation of the ferrite body—that is, the resonant frequency of the cavity is higher during one orientation of the ferrite body than during an opposite orientation. Thus, if the cavity containing the ferrite body is spinning with respect to the magnetic field, the resonant frequency of the cavity will be modulated sinusoidally at the spin rate to produce a frequency deviation whose extent is directly proportional to the magnitude of the magnetic field. Consequently, the magnitude of the component of the magnetic field being measured can be inferred directly from the extent of frequency excursion. The fact that the resonant frequency of the cavity is also slowly drifting, as by reason of a change in temperature, does not interfere with the measurement made by this method. The sinusoidal variations in resonant frequency of the resonator 16 due to its rotation (say at 3 cycles per second) may be relatively low as long as these variations are large as compared to the rate of drift of the resonant frequency.

Figure 8:
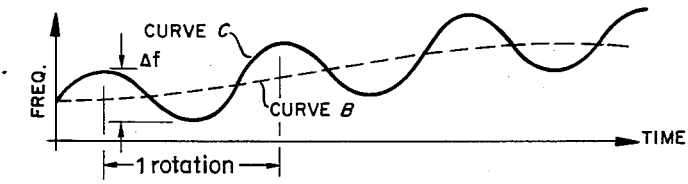
Fig. 8 is a graph illustrating an aspect of the operation of the embodiment shown in Fig. 7.

As illustrated in Fig. 8, the variations in resonator frequency due to rotation is represented by curve C, while the frequency drift is represented by curve B. The extent of the frequency variation determined by the strength of the magnetic field is denoted by $\Delta f$.

An indication of the magnetic field sensed by the spinning resonator arrangement is provided by the processing circuit schematically illustrated in block form in Fig. 9. The arrangement of Fig. 9 is generally similar to that of Fig. 1. The rotating resonator feeds a sinusoidally changing input signal $f_2$ into the mixer 18, the constant frequency resonator feeding a constant frequency $f_1$ into the mixer 18. The mixer 18 will now produce an output difference signal having a constant frequency or carrier frequency $f_r$ component (corresponding to the frequency that would be produced in the absence of any environmental magnetic field) and a modulating component $\Delta f$ corresponding to the sinusoidal frequency variation. (The output signal from the mixer 18 is passed through a band-pass filter 19 to remove extraneous frequency components.) The mixer output signal is then fed into an amplifier-limiter 20, as explained before with respect to Fig. 1, and then to a discriminator circuit 22. The output signal from the discriminator circuit will not be a constant voltage independent of time, as was the case in the example of Fig. 1, but will instead be a unidirectional or direct current signal having a constant voltage level component (corresponding to the voltage level that would be present in the absence of any environmental magnetic field) and a superimposed sinusoidally varying (or low frequency alternating current) component; the period of the sinusoidal voltage variation is the same as that of the spinning resonator, and the amplitude of the sinusoidal component is proportional to the magnitude of the environmental magnetic field. The alternating current component is then separated from the direct current component, for example, by feeding the output from the discriminator circuit through an amplifier 24 to a band-pass filter 25 tuned to the frequency of the sinusoidal variation.

The magnetic field measuring apparatus described is adapted to measure the magnitude of the component of a magnetic field parallel to the longitudinal axis of magnetization of a ferrite element. The apparatus of the invention may also be used to measure the three orthogonal components of a given magnetic field, and hence obtain the resultant field. The apparatus shown in Fig. 10 may be used for this purpose. Briefly, use is made of three ferrite loaded cavities having their respective magnetized ferrite elements oriented in three mutually perpendicular orthogonal directions in space. The three variable signal frequencies, each associated with a ferrite loaded cavity, are each separately heterodyned with the signal from a reference oscillator to produce three difference signals. Each of the difference signals varies in frequency in accordance with the measured variation of the component of magnetic field associated with it. The three difference signals are then passed through appropriate circuits to produce three output signals which have amplitudes representative of the magnitudes of the respective components of magnetic field to be measured.

Figure 10:
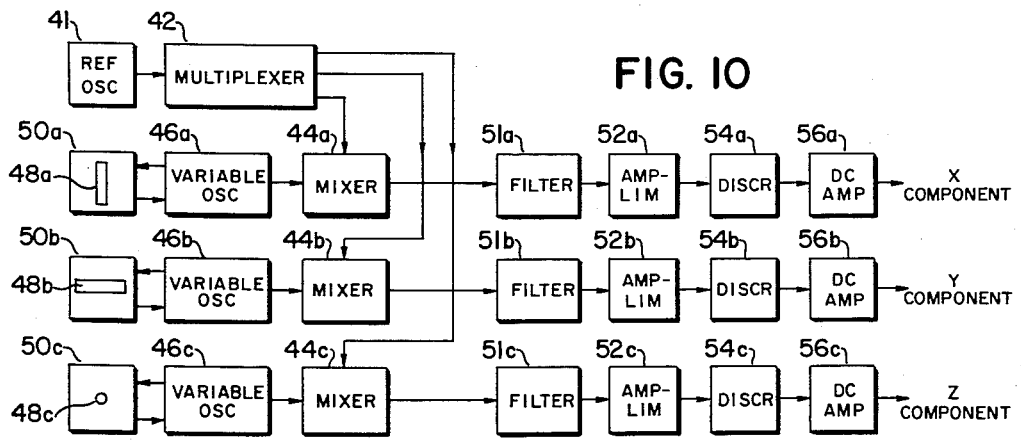
Fig. 10 is a block circuit diagram of magnetometer apparatus useful in measuring the field strengths of each of three mutually perpendicular components of an environmental magnetic field.

Referring to Fig. 10, the constant frequency signal output of a constant frequency reference oscillator 41 is channeled into each of three mixers 44a, 44b, and 44c. This may be realized, for example, by successively channeling the signals into the mixers 44a to 44c by means of a multiplexer 42. The output signals of three variable frequency oscillators 46a, 46b, and 46c, are also fed to the mixers 44a, 44b, and 44c, respectively. The signal frequencies of these oscillators 46a, 46b, and 46c are variable in accordance with the strength of the environmental magnetic field applied to three ferrite bodies 48a, 48b, and 48c, one body being associated with each oscillator. The ferrite bodies 48a, 48b, and 48c are each mounted within an associated cavity resonator 50a, 50b, and 50c, respectively, with the bodies having mutually perpendicular magnetized orientations.

As indicated above, the three ferrite bodies 48a, 48b, and 48c are mounted such that their axes of magnetization are mutually perpendicular. Consequently, the frequencies of the difference signal outputs of the mixers 44a, 44b, and 44c collectively can be used to provide any desired information relative to the magnitudes of the magnetic field components in the region of the apparatus. The processing of the difference frequency signals may be realized in a manner similar to that described above, with each of the difference signals being successively subjected to band-pass filters 51a, 51b, and 51c, amplifier-limiters 52a, 52b, and 52c, discriminators 54a, 54b, and 54c, and direct current amplifiers 56a, 56b, and 56c to produce three direct current signal outputs representing, respectively, the orthogonal $x$, $y$, and $z$ components of the environmental magnetic field. Once the three magnetic field components have been determined, they can be combined to determine the resultant magnetic field.

While the aparatus of the invention has been described as applied to the measurement of environmental magnetic fields, it will be appreciated that it may be used for other end purposes. For example, the novel arrangement of the invention may be used to provide an inertial navigation system. In such an arrangement the apparatus of Fig. 10 is used to provide a reading of a region of space in terms of magnetic field coordinates. If each of the regions of space through which navigation is desired has been previously mapped in terms of magnetic field strength coordinates, the location of a vehicle at any one of the pre-measured regions can be determined by comparing the measured magnetic field coordinates with the previously established map of field coordinates. The comparing of measured magnetic field coordinates with the map may be accomplished manually, in order to provide checks on the location of a vehicle from time to time, or may be realized by a computer provided for the purpose. In the latter case the arrangement may be used, for example, to provide automatic inertial guidance for aircraft, with the flight of the aircraft being programmed to follow a predetermined series of magnetic field coordinates of predetermined relative magnitudes.

From the foregoing it is seen that the novel and improved magnetic field responsive apparatus of the invention is not only useful in measuring the magnitudes of relatively low magnetic fields, but is also useful in providing other information.

What is claimed is:

1. Apparatus for measuring magnetic fields, comprising: a first source of microwave signal energy connected to provide a first microwave signal output; a second source of microwave signal energy connected to provide a second microwave signal output; magnetic field responsive means coupled to said second source to change the frequency of the output signal of said second source in response to variations in magnetic field applied to said magnetic field responsive means; and means coupled to said first and second sources to compare the frequencies of said first and second microwave signal outputs and to produce a resultant signal which is a function of the magnitude of the magnetic field applied to said magnetic field responsive means; said magnetic field responsive means including at least one cavity resonant to one frequency in the absence of a magnetic field and resonant to a frequency different from that of said one frequency in the presence of a magnetic field.

2. The apparatus claimed in claim 1, wherein said at least one cavity of said magnetic field responsive means includes a ferrite element.

3. A magnetometer for measuring an environmental magnetic field, comprising, in combination: first means connected to generate a first microwave signal of a predetermined frequency; second means connected to generate a second microwave signal of a frequency different from that of said first microwave signal; a cylindrical resonant cavity including an elongated coaxial ferrite element and directly coupled to only said second means, said element being magnetized, independently of the environmental magnetic field to be measured, to a region of ferromagnetic resonance in the same frequency region as that including said second microwave signal frequency, with the resonant frequency of said cavity being such that changes in environmental magnetic field effect changes in magnetization of said element thereby to change the resonant frequency of said cavity; and frequency comparing means connected to said first and second means to compare the frequencies of said first and second microwave signals so as to produce a resultant signal which is representative of the magnitude of the environmental magnetic field affecting said ferrite element.

4. Environmental magnetic field measuring apparatus of the kind described, comprising: two microwave signal generators each adapted to generate microwave signal energy, a first of said generators being adapted to generate signal energy at a frequency substantially within the frequency range within which a ferromagnetic material is capable of exhibiting ferromagnetic resonance; each of said generators being positioned to be subjected to substantially the same environmental magnetic field to be measured, and each generator including a microwave cavity frequency-determining means connected to determine the output frequency of the signal generated by its respective generator; the cavity means of said first generator including a ferromagnetic material of a type having a ferromagnetic resonance frequency substantially adjacent to the resonant frequency of said first generator cavity means in the absence of an environmental magnetic field, with said ferromagnetic material being positioned to change the resonant frequency of its associated cavity means in response to the subjection of said ferromagnetic material to the environmental magnetic field to be measured; whereby said first microwave generator is adapted to produce an output signal whose frequency is influenced by the subjection of said ferromagnetic material to the environmental magnetic field; the microwave cavity frequency-determining means associated with the other microwave generator being substantially free of ferromagnetic material exhibiting said ferromagnetic resonance property; and frequency comparing means connected to receive the output signals from both of said microwave generators and to produce a resultant signal representative of the change in output signal frequency of said first generator produced by said environmental magnetic field.

5. The apparatus claimed in claim 4, wherein said ferromagnetic material is a ferrite.

6. The apparatus claimed in claim 4, wherein said ferromagnetic material is substantially unmagnetized in the absence of an environmental magnetic field.

7. The apparatus claimed in claim 4, wherein said microwave signal generators comprise resonant cavity controlled oscillators.

8. Apparatus for measuring magnetic fields, comprising: a first source of microwave signal energy connected to provide a microwave signal output; a second source of microwave signal energy connected to provide a microwave signal output; magnetic field responsive means coupled to said second source to change the frequency of the output signal of said second source in response to variations in magnetic field applied to said magnetic field responsive means; and means coupled to said first and second sources to compare the frequencies of the output signals of said sources and to produce a resultant signal which is a function of the magnitude of the magnetic field applied to said magnetic field responsive means.

9. The apparatus claimed in claim 8, wherein said second source of microwave signal energy comprises a resonant cavity controlled oscillator.

10. Environmental magnetic field measuring apparatus of the kind described, comprising: two microwave signal generators each adapted to generate microwave signal energy, and microwave signal frequency comparing means; a first of said generators being adapted to generate signal energy at a frequency substantially within the frequency range within which a ferromagnetic material is capable of exhibiting ferromagnetic resonance; each of said generators being positioned to be subjected to substantially the same environmental magnetic field to be measured, and each generator including a microwave cavity frequency-determining means connected to determine the output frequency of the signal generated by its respective generator; the cavity means of said first generator including a substantially unmagnetized ferromagnetic material of a type having a ferromagnetic resonance frequency substantially adjacent to the resonant frequency of said first generator cavity means in the absence of an environmental magnetic field, with said ferromagnetic material being positioned to change the resonant frequency of its associated cavity means in response to the subjection of said ferromagnetic material to the environmental magnetic field to be measured; whereby said first microwave generator is adapted to produce an output signal whose frequency is influenced by the subjection of said ferromagnetic material to the environmental magnetic field; the microwave cavity frequency-determining means associated with the other microwave generator being substantially free of ferromagnetic material exhibiting said ferromagnetic resonance property; said frequency comparing means being connected to receive the output signals from both of said microwave generators and to produce a resultant signal representative of the change in output signal frequency of said first generator produced by said environmental magnetic field.

11. Magnetic field indicating apparatus of the kind adapted to provide an indication of the magnitude of an environmental magnetic field, comprising: two microwave signal generators each adapted to generate microwave signal energy, and microwave signal frequency comparing means; a first of said generators being adapted to generate signal energy at a frequency substantially within the frequency range within which a ferromagnetic material is capable of exhibiting ferromagnetic resonance; each of said generators being positioned to be subjected to substantially the same environmental magnetic field to be measured, and each generator including a microwave cavity frequency-determining means connected to determine the output frequency of the signal generated by its respective generator; the cavity means of said first generator including a ferromagnetic material of a type having a ferromagnetic resonance frequency substantially adjacent to the resonant frequency of said first generator cavity means in the absence of an environmental magnetic field, with said ferromagnetic material being positioned to change the resonant frequency of its associated cavity means in response to the subjection of said ferromagnetic material to the environmental magnetic field to be measured; whereby said first microwave generator is adapted to produce an output signal whose frequency is influenced by the subjection of said ferromagnetic material to the environmental magnetic field; the microwave cavity frequency-determining means associated with the other microwave generator being substantially free of ferromagnetic material exhibiting said ferromagnetic resonance property; said frequency comparing means being connected to receive the output signals from both of said microwave generators and to produce a resultant signal representative of the change in output signal frequency of said first generator produced by said environmental magnetic field, said frequency comparing means including a mixer circuit connected to compare the output signals from said generators and to produce a difference signal whose frequency is representative of the magnitude of the environmental magnetic field, a filter connected to receive the output signal from said mixer circuit and to pass only signals having a frequency content lying within the expected range of frequency variation representative of the range of expected magnitudes of the environmental magnetic field, a discriminator circuit connected to receive the difference signal from said filter for producing a direct current signal whose amplitude is representative of the magnitude of the measured magnetic field, and magnetic field indicating means connected to receive the output signal from said discriminator circuit for providing the desired magnetic field indication.

12. A magnetometer, comprising: means for generating a first microwave signal of one predetermined frequency; means for generating a second microwave signal of a frequency different from that of said first microwave signal; a resonant cavity, defined by magnetically transparent conductive material, coupled to only one of said means and containing a ferrite body, said cavity being connected to said one of said means for the establishment of microwave frequency energy within said cavity in a direction at right angles to that of the magnetic field component whose magnitude is to be determined, thereby to change the signal frequency of the signal generating means associated with said cavity in response to variations in magnetic field applied to said body in said last named direction; a mixer circuit connected to combine the two signals from said first and second signal generating means to produce a heterodyne signal representative of the frequency difference between said first and second microwave signals; and means connected to said mixer circuit to produce an output signal which varies in response to the frequency variations of said heterodyne signal, thereby to provide a resultant signal representative of the variations in magnitude of the component of the magnetic field to which said ferrite body is responsive in frequency change.

13. The apparatus claimed in claim 12, wherein said body is elongated and is positioned with its long axis in a direction parallel to the direction of the magnetic field component to be measured.

14. Environmental magnetic field measuring apparatus of the kind described, comprising: two microwave signal generators each including resonant cavity controlled oscillators and each connected to generate microwave signal energy, at a frequency different from that of the other, a first of said generators being adapted to generate signal energy at a frequency substantially within the frequency range within which a ferrite material is capable of exhibiting ferromagnetic resonance; each of said generators being positioned to be subjected to substantially the same environmental magnetic field to be measured, and each generator including a microwave cavity frequency-determining means connected to determine the output frequency of the signal generated by its respective generator; the cavity means of said first generator including a ferrite material of a type having a ferromagnetic resonance frequency substantially adjacent to the resonant frequency of said first generator cavity means in the absence of an environmental magnetic field, with said ferrite material being positioned to change the resonant frequency of its associated cavity means in response to the subjection of said material to the environmental magnetic field to be measured; whereby said first microwave generator is adapted to produce an output signal whose frequency is influenced by the subjection of said ferrite material to the environmental magnetic field; the microwave cavity frequency-determining means associated with the other microwave generator being substantially free of ferromagnetic material exhibiting said ferromagnetic resonance property; and frequency comparing means connected to receive the output signals from both of said microwave generators and to produce a resultant signal representative of the change in output signal frequency of said first generator produced by said environmental magnetic field, said frequency comparing means including a mixer circuit connected to heterodyne the microwave signal energy from said first generator with that from said other generator and thereby produce a heterodyne signal representative of the frequency difference between the signal energy generated by said generators, discriminator means connected to receive said heterodyne signal and to produce therefrom a signal whose amplitude is a function of the frequency change in the signal energy from said first generator due to the subjection of said ferrite material to said environmental magnetic field, and amplitude responsive signal utilization means connected to receive the output signal from said discriminator means and to produce a response that is a function of the experienced environmental magnetic field.

15. Environmental magnetic field measuring apparatus of the kind adapted to measure the magnitude of magnetic field components in three mutually perpendicular directions, comprising: two microwave signal generator means each adapted to generate microwave signal energy, a first of said generator means including three resonant cavity controlled oscillators each adapted to generate signal energy at a frequency substantially within the frequency range within which a ferromagnetic material is capable of exhibiting ferromagnetic resonance; each of said oscillators being associated with a cavity positioned to be subjected to a component of said environmental magnetic field in a direction perpendicular to the directions of the magnetic field components to be measured by the other two cavities associated with said first generator means, and each cavity connected to determine the output frequency of the signal generated by its associated oscillator; each of said cavities including a ferromagnetic material of a type having a ferromagnetic resonance frequency substantially adjacent to the resonant frequency of its associated cavity in the absence of an environmental magnetic field, with each of said ferromagnetic materials being positioned to change the resonant frequency of its associated cavity in response to the subjection of the ferromagnetic material to the associated component of the environmental magnetic field to be measured, whereby each of said oscillators of said first generator means is adapted to produce an output signal whose frequency is influenced by the subjection of its included ferromagnetic material to the associated component of the environmental magnetic field; the other microwave generator means including a resonant cavity controlled oscillator associated with a cavity that is substantially free of ferromagnetic material exhibiting said ferromagnetic resonance property; and frequency comparing means connected to receive the output signals from both of said microwave generator means and to produce three resultant signals each representative of the change in output signal frequency, of a respective one of said oscillators of said first generator means, produced by an associated component of said environmental magnetic field.

References Cited in the file of this patent
UNITED STATES PATENTS

| | | |
|---|---|---|
| 2,597,149 | Kahan | May 20, 1952 |
| 2,671,884 | Zaleski | Mar. 9, 1954 |
| 2,779,914 | Rumbaugh et al. | Jan. 29, 1957 |

OTHER REFERENCES

Tuller, Galloway, and Zaffarano: Proceedings of the I.R.E., June 1948, pages 794–800.

Crain: Proceedings of the I.R.E., October 1955, pages 1405–1411.

Nelson: Proceedings of the I.R.E., October 1956, pages 1449–1455.

W. L. Whirry and C. E. Nelson: I.R.E., Transactions on Microwave Theory and Techniques, vol. MTT-6, No. 1, Jan. 1958, pg. 59–65.